US008829925B2

(12) United States Patent
McBrien

(10) Patent No.: US 8,829,925 B2
(45) Date of Patent: Sep. 9, 2014

(54) CAPACITIVE POSITION SENSOR

(75) Inventor: Gary M. McBrien, South Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 188 days.

(21) Appl. No.: 13/528,046

(22) Filed: Jun. 20, 2012

(65) Prior Publication Data

US 2013/0342219 A1 Dec. 26, 2013

(51) Int. Cl.
*G01R 27/26* (2006.01)

(52) U.S. Cl.
USPC .......................................................... 324/658

(58) Field of Classification Search
CPC .................................................... G01D 5/2405
USPC ................................................. 324/658–690
See application file for complete search history.

(56) References Cited

U.S. PATENT DOCUMENTS

| | | | | | |
|---|---|---|---|---|---|
| 3,702,957 | A | * | 11/1972 | Wolfendale | 361/280 |
| 3,961,318 | A | * | 6/1976 | Farrand et al. | 324/660 |
| 4,841,224 | A | * | 6/1989 | Chalupnik et al. | 324/662 |
| 5,418,468 | A | * | 5/1995 | Baker et al. | 324/674 |
| 5,585,733 | A | * | 12/1996 | Paglione | 324/678 |
| 5,594,353 | A | * | 1/1997 | Hemphill | 324/681 |
| 7,663,502 | B2 | | 2/2010 | Breed | |
| 8,020,453 | B2 | | 9/2011 | Kreit et al. | |
| 2005/0017488 | A1 | | 1/2005 | Breed et al. | |
| 2011/0146413 | A1 | | 6/2011 | Masek | |

FOREIGN PATENT DOCUMENTS

| | | | | |
|---|---|---|---|---|
| DE | 102007055189 | A1 | * | 5/2009 |
| WO | WO 2012139672 | A1 | * | 10/2012 |

* cited by examiner

*Primary Examiner* — Melissa Koval
*Assistant Examiner* — Daniel Miller
(74) *Attorney, Agent, or Firm* — Kinney & Lange, P.A.

(57) ABSTRACT

A transducer includes a plurality of electrodes and a dielectric shuttle. The dielectric shuttle passes between a subset of the electrodes, modifying the capacitance between them. By measuring the capacitance of subsets of the electrodes, the position of the dielectric shuttle may be determined.

17 Claims, 9 Drawing Sheets

2 20 30 40 52 90A 54 91A 56 70 100 10 42 50 80 72 100 30 52 90B 54 91B 56 70 2

CAPACITIVE POSITION SENSOR

BACKGROUND

The present invention relates to transducers. More particularly, the present invention relates to electronic measurement of displacement.

Devices and methods for measuring position and displacement generally are known. Transducers that convert mechanical energy to electrical energy are used in a variety of fields, such as potentiometers, process transmitters, or load cells. One such transducer is a feedback device used in a fuel metering system. A commonly used transducer that converts mechanical position to an electrical signal is a Linear Variable Differential Transformer (LVDT). An LVDT usually includes three inductive coils and a magnetic slug. One of the coils is driven with an electric current, and the position of the slug can be determined based on the induced current through the other two coils. Rotary versions of differential transformers are also known, such as Rotary Variable Differential Transformers (RVDTs).

Position sensing devices such as LVDTs and RVDTs take up space, add weight, and have construction features that can create undesired failure modes and associated high failure rates. Temperature and vibration in the environment in which the LVDTs and RVDTs are used can be damaging to these sensing devices. Additionally, LVDTs and RVDTs employed with actuators contribute significantly to the cost of devices such as fuel metering systems, and for specific applications, are often purchased as special items from a limited number of approved sources.

SUMMARY

According to the present invention, an improved transducer is provided, allowing a user to determine physical position based on electrical output. Embodiments of the invention may be used to provide integrated position sensing within the assembly of the device that requires feedback. A set of electrodes is arranged such that movement of a dielectric shuttle causes the capacitance between subsets of the electrodes to change. In order to provide integrated position sensing, the electrodes may be situated on the interior of an actuator bore wall, and the dielectric shuttle attached to an actuator assembly. By sensing the difference in capacitance of subsets of electrodes, it is possible to determine the magnitude and direction of the movement of the dielectric shuttle.

DETAILED DESCRIPTION

In general, the present invention measures position and/or change in position by measuring capacitance of two or more sets of electrodes. Movement of a dielectric shuttle between two or more electrodes, where the dielectric shuttle is made of several portions with different relative permittivities, generates a change in capacitance between the electrodes.

Figure 1A:
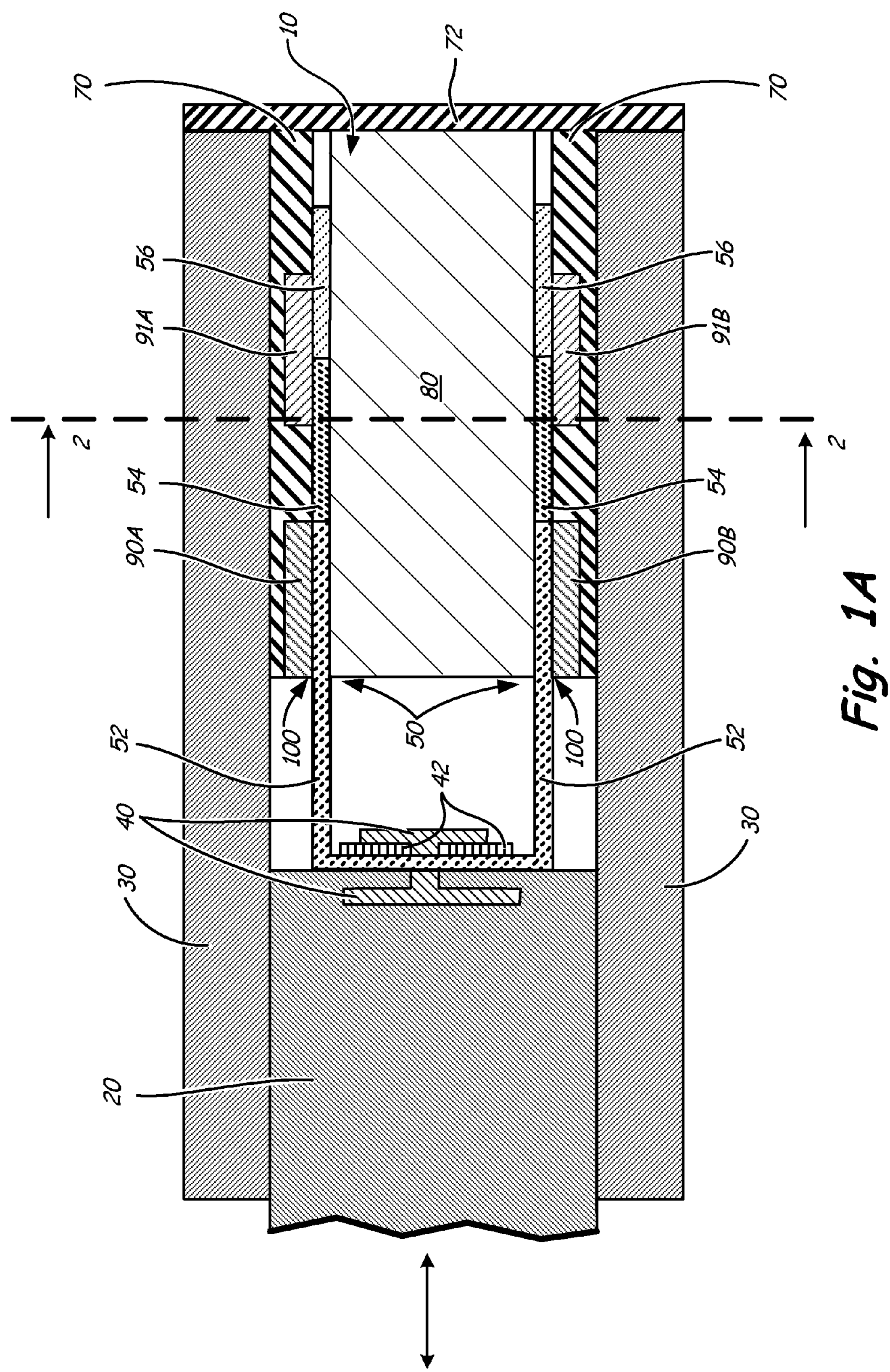
FIGS. 1A-1B are side cross-sectional views of a cylindrical transducer incorporating a capacitive position sensor.

FIG. 1A is a side cross-sectional view of transducer 10 which functions as a sensor, and which is housed within an actuator construction. This embodiment of the invention includes actuation assembly 20, actuator bore wall 30, coupling 40, compression springs 42, dielectric shuttle 50 (which includes first dielectric constant portion 52, second dielectric constant portion 54, and third dielectric constant portion 56), first insulating material 70, second insulating material 72, common electrode 80, first sensing electrodes 90A and 90B, second sensing electrodes 91A and 91B, and surface 100 (defined by the faces of first insulating material 70, first sensing electrodes 90A and 90B, and second sensing electrodes 91A and 91B adjacent to dielectric shuttle 50).

In this embodiment, transducer 10 includes dielectric shuttle 50 (formed by first dielectric constant portion 52, second dielectric constant portion 54, and third dielectric constant portion 56), first insulating material 70, second insulating material 72, common electrode 80, first sensing electrodes 90A and 90B, and second sensing electrodes 91A and 91B. Transducer 10 is attached to actuation assembly 20, and may be used to measure movement of actuation assembly 20. Only a portion of actuation assembly 20 is shown. Here, actuation assembly 20 is free to move along the interior of actuator bore wall 30. Actuator bore wall 30 is shaped as a cylinder open at both ends, and actuation assembly 20 has a solid cylindrical portion which is free to move within actuator bore wall 30 coaxially. Actuation assembly 20 may be, for example, a part of an actuator construction of a fuel metering system.

Actuator bore wall 30 may be the interior wall of any bore suitable for containment of transducer 10; for example, actuator bore wall 30 may be the wall of a cylindrical hole drilled out of a solid piece of metal. In alternative embodiments, actuator bore wall 30 may be the wall of a rectangular prism, or be in the shape of a parallelepiped or generalized cylinder, or any other shape surrounding a cavity with dimensions that do not change along at least one axis. In those embodiments, the shape of actuation assembly 20 may be modified to complement actuator bore wall 30. Actuator bore wall 30 provides a structure for transducer 10, but is not necessary in all embodiments. Some embodiments of the present invention may not include actuator bore wall 30, and rather have first insulating material 70 and second insulating material 72 as the outermost portion of the device.

Coupling 40 couples actuation assembly 20 to dielectric shuttle 50. Compression springs 42 are included between coupling 40 and dielectric shuttle 50. Coupling 40 may be any means to affix dielectric shuttle 50 to actuation assembly 20 that would be understood by those or ordinary skill in the art, such as screws, adhesives, or welding. In the present embodiment, coupling 40 is a solid device with a portion inside actuation assembly 20 and a portion in contact with compression springs 42 and outside actuation assembly 20, such that movement of actuation assembly 20 results in proportional movement of dielectric shuttle 50. In some embodiments, coupling 40 allows dielectric shuttle 50 to self-align in the space between surface 100 and common electrode 80. Additionally, the portions of coupling 40 which come into physical contact with dielectric shuttle 50 may be rounded to accommodate tolerance errors.

Along a portion of the interior wall of actuator bore wall 30 is first insulating material 70. In this embodiment, first insulating material 70 is shaped roughly as a cylinder, where the cylinder is closed at one end by second insulating material 72, with recesses for each of first sensing electrodes 90A and 90B and second sensing electrodes 91A and 91B. As a result, dielectric shuttle 50 is free to slide across surface 100 without impingement or obstacles. First insulating material 70 and second insulating material 72 may further be used to prevent electrical contact between other components which are preferably electrically disconnected, such as lead wires (not shown), common electrode 80, first sensing electrodes 90A and 90B, second sensing electrodes 91A and 91B, actuator bore wall 30 and/or actuation assembly 20. Suitable materials for first insulating material 70 and second insulating material 72 include polymers, glass, ceramics, or porcelain, among others. First insulating material 70 and second insulating material 72 need not be made of the same substance, but often will be. In some embodiments, first insulating material 70 and second insulating material 72 may be a single piece of insulating material.

Dielectric shuttle 50 is comprised of first dielectric constant portion 52 at a first end of dielectric shuttle 50, second dielectric constant portion 54 adjacent to first dielectric constant portion 52, and third dielectric constant portion 56 which is adjacent to second dielectric constant portion 54 and opposite second dielectric constant portion 54 from first dielectric constant portion 52. Often first dielectric constant portion 52 and third dielectric constant portion 56 will have the same relative permittivity. Adjacent dielectric constant portions (e.g. first dielectric constant portion 52 and second dielectric constant portion 54, or second dielectric constant portion 54 and third dielectric constant portion 56) have distinct relative permittivities. The relative sizes of first dielectric constant portion 52, second dielectric constant portion 54, and third dielectric constant portion 56 may be different depending on the particular embodiment. Second dielectric constant portion 54 may, for example, be smaller or larger than first dielectric constant portion 52. Likewise, third dielectric constant portion 56 may be larger or smaller than second dielectric constant portion 54 and/or first dielectric constant portion 52. In some embodiments, there need not be second dielectric constant portion 54 or third dielectric constant portion 56. In those embodiments, dielectric shuttle 50 may be detected so long as first dielectric constant portion 52 has a different relative permittivity than the ambient environment surrounding dielectric shuttle 50, such as air, water, fuel, or vacuum, among others.

Any materials with suitable dielectric constants may be used for first dielectric constant portion 52, second dielectric constant portion 54, or third dielectric constant portion 56. In particular, various types of glass and ceramic are recognized by those of ordinary skill in the art, which have relative permittivities of between 5 and 10. Higher relative permittivity dielectrics may be desirable in some embodiments. Materials such as barium titanate or ceramic dielectrics may also be used that have relative permittivities greater than 10, and often at least several thousand. The dielectric material may also be a composite structure, for example a combination of an insulating material such as fiberglass or PEEK, and a material with high permittivity such as barium titanate. The composite construction may be used if such a structure has more desirable structural and permittivity properties, for example where PEEK might provide a supporting structure, or scaffold, and barium titanate provides high permittivity. Additional materials may be beneficial for different embodiments depending on their cost, relative permittivity, or insensitivity to environmental conditions such as temperature or vibration.

Compression springs 42 are used to couple actuation assembly 20 to dielectric shuttle 50 and allow dielectric shuttle 50 to pivot around coupling 40 and mitigate the effect of, for example, any machining imperfections which would impinge on the motion of a rigidly designed system as dielectric shuttle 50 travels along surface 100 or common electrode 80. Compression springs 42 may also allow dielectric shuttle 50 to self-align in the space between common electrode 80 and sensing electrodes 90A, 90B, 91A, and/or 91B. In alternative embodiments, compression springs 42 may be omitted, or various other mechanisms may be employed to mitigate the effect of such imperfections, such as inclusion of a gap around dielectric shuttle 50.

Common electrode 80 is made of any material suitable as a capacitive plate, such as metal or graphene, among others. Common electrode 80 is capable of developing a charge near or at its surface adjacent to the dielectric materials when subjected to an applied voltage. In this embodiment, common electrode 80 is substantially shaped as a solid cylinder. However, in alternative embodiments, common electrode 80 may be shaped as a tube, as a partially filled cylinder, as a hollow cylinder, as a flat plate (see FIG. 3), or as a curved plate, among others. Common electrode 80 may also be shaped such that the distance between common electrode 80 and various sensing electrodes varies. Lead wires or other electrical connections (not shown) may be attached to common electrode 80. Such lead wires may further be routed through first insulating material 70, second insulating material 72, actuator assembly 20, and/or actuator bore wall 30.

First sensing electrodes 90A and 90B and second sensing electrodes 91A and 91B are also made of any material suitable for allowing buildup of charge when subjected to an applied voltage. Because first sensing electrodes 90A and 90B and second sensing electrodes 91A and 91B are disposed in recesses in first insulating material 70, the geometries of first sensing electrodes 90A and 90B and second sensing electrodes 91A and 91B are determined by the shape of first insulating material 70 and the size and shape of the recesses therein. In the present embodiment, first sensing electrodes 90A and 90B and second sensing electrodes 91A and 91B are shaped as sections of ring segments or open tubes. However, in alternative embodiments, first sensing electrodes 90A and 90B and second sensing electrodes 91A and 91B may be flat (see FIG. 3), curved (see FIG. 2), or other shaped complementing the shape of first insulating material 70 and common electrode 80. Lead wires (not shown) may be connected to first sensing electrodes 90A and 90B and second sensing electrodes 91A and 91B. Such lead wires may further be routed through first insulating material 70, second insulating material 72, actuator assembly 20, and/or actuator bore wall 30.

In combination, the faces of first insulating material 70, first sensing electrodes 90A and 90B, and second sensing electrodes 91A and 91B adjacent to dielectric shuttle 50 form surface 100. Surface 100 is substantially smooth, and in this embodiment is shaped substantially as a cylinder, wherein second insulating material 72 extends perpendicular to the axis of the cylinder at one end. In other embodiments, surface 100 may comprise any parallelepiped, generalized cylinder, or other shape with dimensions that do not change along at least one axis.

In this embodiment, transducer 10 and actuator bore wall 30 are cylindrical in shape. Actuation assembly 20 is contained within actuation bore wall 30. Actuation assembly 20 may at least partially protrude out of actuator bore wall 30. Coupling 40 is used to attach dielectric shuttle 50 to actuation assembly 20. Actuation assembly 20 is located at a first end of transducer 10, and second insulating material 72 transects actuator bore wall 30 at a second end of transducer 10, where the second end is opposite transducer 10 from the first end. First insulating material 70 is disposed along actuator bore wall 30. First insulating material 70 includes a plurality of recesses upon which first sensing electrodes 90A and 90B and second sensing electrodes 91A and 91B are arranged, such that surface 100 facing dielectric shuttle 50 is substantially smooth. Dielectric shuttle 50 is substantially shaped as a tube coaxial with actuator bore wall 30. Common electrode 80 is arranged opposite dielectric shuttle 50 from surface 100, and common electrode 80 is also shaped as a cylinder substantially coaxial with actuator bore wall 30.

In alternative embodiments, the overall shape of transducer 10 may vary. For example, in alternative embodiments, transducer 10 may be a rectangular prism, or it may be substantially flat (see FIG. 7). In this embodiment, dielectric shuttle 50 passes between common electrode 80 and one or both of first sensing electrodes 90A and 90B and second sensing electrodes 91A and 91B. Transducer 10 is not attached to actuation assembly 20 in all embodiments, but generally functions as a position sensor. In this embodiment, transducer 10 is an apparatus which converts physical position or movement into electrical signal. Such sensors may be useful, for example, in fuel metering systems.

In general, the capacitance of a pair of electrodes is directly proportional to the dielectric constant of the substance between the electrodes. Accordingly, as the percentage of a high dielectric constant portion between first sensing electrode 90A and common electrode 80 increases, the capacitance of the combination of first sensing electrodes 90A with common electrode 80 also increases. Therefore, by measuring the capacitance of first sensing electrode 90A with common electrode 80, the position of first dielectric constant portion 52, second dielectric constant portion 54, third dielectric constant portion 56, and by inference dielectric shuttle 50 and actuation assembly 20, can be determined. Likewise, by measuring the capacitance of first sensing electrode 90B, second sensing electrode 91A or second sensing electrode 91B with common electrode 80, the position of first dielectric constant portion 52, second dielectric constant portion 54, and third dielectric constant portion 56, and by inference dielectric slider 50 and actuation assembly 20, can be determined.

By measuring capacitances between both common electrode 80 with first sensing electrodes 90A-90B and common electrode 80 with second sensing electrodes 91A-91B, the mathematics for the conversion of the rising and falling capacitances to the position of dielectric shuttle 50 and hence actuation assembly 20 position provides for the cancellation of several error effects. For example, multiple capacitance measurements allows for cancelling of errors associated with changes in capacitance due to variations in the size of the unfilled space between common electrode 80 and first sensing electrodes 90A-90B and/or second sensing electrodes 91A-91B, which can be present from unit to unit in production over time. Additional errors, such as those created by temperature variation during use, stray capacitance, or variation in the permittivity of the dielectric materials, may also be accounted for by comparing the capacitance measurements of several such sets of electrodes. The embodiment shown in FIG. 1A utilizes five electrodes, and a system with fewer electrodes in this embodiment would not necessarily provide enough information to determine the direction of movement of dielectric shuttle 50. Alternative embodiments may utilize more or fewer electrodes. The embodiment shown in FIG. 5, for example, utilizes two electrodes.

During operation, actuator assembly 20 and dielectric shuttle 50 are positioned such that dielectric shuttle 50 is at least partially between first sensing electrodes (90A and 90B) and common electrode 80 and/or at least partially between second sensing electrodes (91A and 91B) and common electrode 80. By sensing the capacitance of any two of the electrodes including common electrode 80 (for example, first sensing electrode 90A with common electrode 80, or second sensing electrode 91A with common electrode 80), information regarding the position of dielectric shuttle 50 can be determined.

As actuation assembly 20 moves, dielectric shuttle 50 also moves via coupling 40 and compression springs 42. In many embodiments, dielectric shuttle 50 is intended to move substantially parallel to the adjacent surfaces of the electrodes. The movement of dielectric shuttle 50 need not be exactly parallel in order for accurate position sensing. Deviation from parallel of 1° or less is substantially parallel. More preferably, the movement of dielectric shuttle 50 deviates from parallel by 0.2° or less. As a result of movement of dielectric shuttle 50, the percentage of the space between first sensing electrodes 90A and 90B and common electrode 80 made up of first dielectric constant portion 52, second dielectric constant portion 54, and third dielectric constant portion 56 will change with the position of dielectric shuttle 50. Likewise, the percentage of the space between second sensing electrodes 91A and 91B and common electrode 80 made up of first dielectric constant portion 52, second dielectric constant portion 54, and third dielectric constant portion 56 will change with the position of dielectric shuttle 50. From these capacitances, it is possible to measure the position of dielectric shuttle 50. In alternative embodiments, the relative positions of sensing electrodes 90A, 90B, 91A and 91B may be switched with common electrode 80 such that sensing electrodes 90A, 90B, 91A and 91B are arranged opposite common electrode 80 from actuator bore wall 30.

By employing similar geometry and electronics to current LVDT technology, this embodiment can replace existing LVDTs and other position sensors. Choosing suitable materials for components in transducer 10 may result in a less expensive, more robust transducer. For example, many dielectrics are more impervious to shock, heat, or vibration than the fine wire windings used in many LVDT sensors.

Figure 1B:
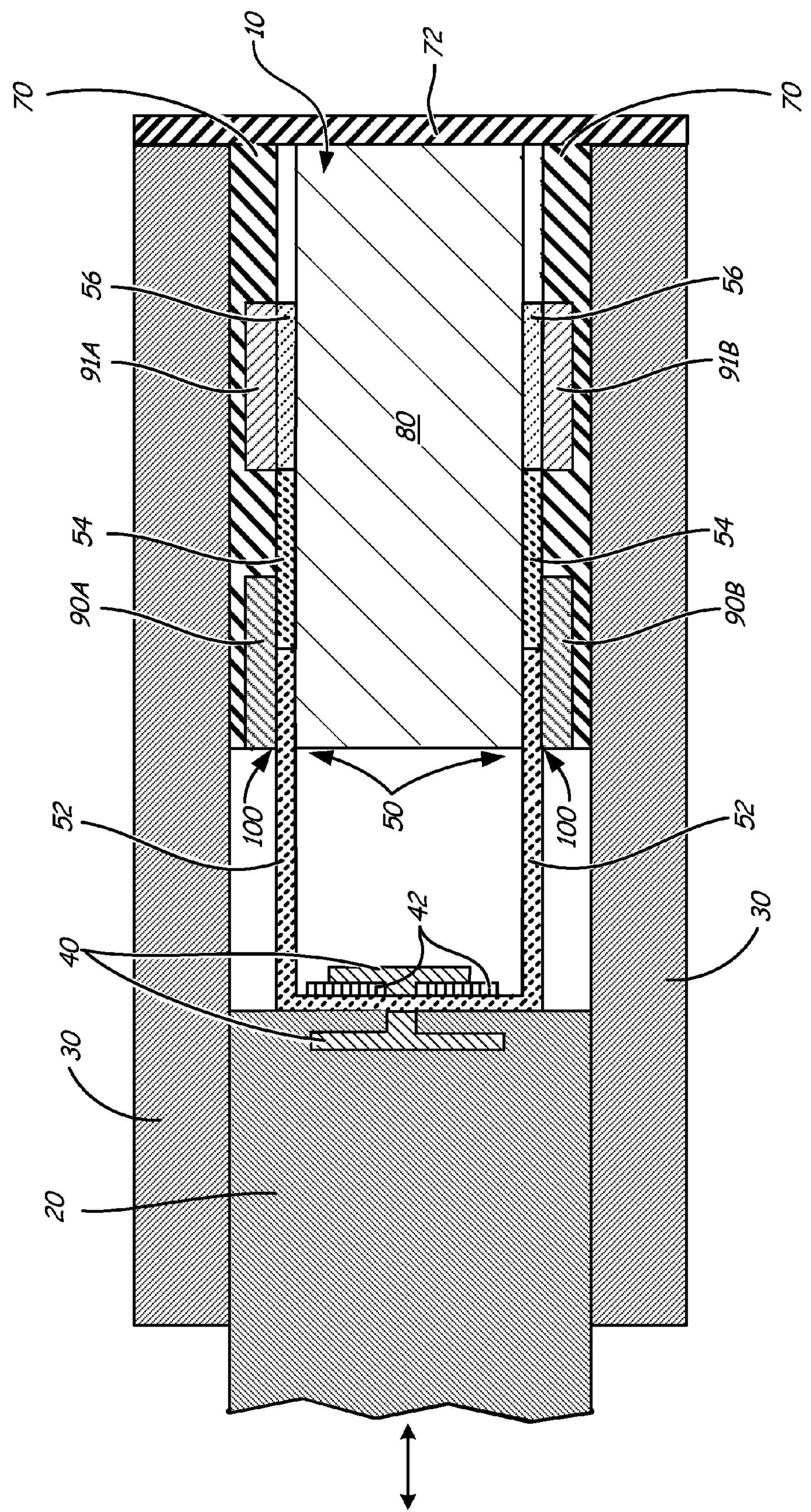

FIG. 1B shows the same embodiment of the invention shown in FIG. 1A. In this view of the embodiment, actuation assembly 20 has been moved away from second insulating material 72, along with dielectric shuttle 50. As a result, the position of first dielectric constant portion 52, second dielectric constant portion 54, and third dielectric constant portion 56 relative to first sensing electrodes 90A and 90B and second sensing electrodes 91A and 91B has changed.

Figure 2:
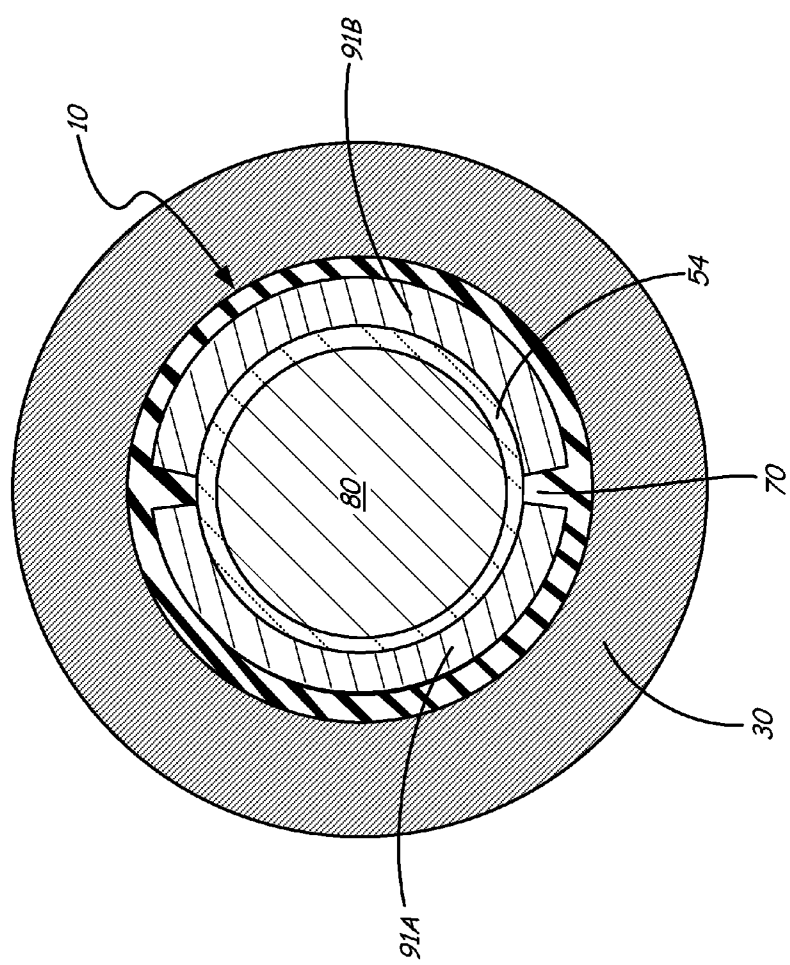
FIG. 2 is a front cross-sectional view of a cylindrical transducer incorporating a capacitive position sensor with bifurcated sensing electrodes taken along line 2-2.

FIG. 2 is a front cross-sectional view of a cylindrical transducer incorporating a capacitive position sensor with a bifurcated electrode taken along line 2-2 shown in FIG. 1A. In this view of the embodiment, the cylindrical actuator assembly is shown at the cross section where second dielectric constant portion 54 is arranged between common electrode 80 and bifurcated second sensing electrodes 91A and 91B.

This embodiment shows bifurcated transducer 10. The components of this embodiment may be the same as those shown in FIGS. 1A-1B, above. For example, as in FIGS. 1A-1B, this embodiment includes actuator bore wall 30, first insulating material 70, common electrode 80, and dielectric shuttle 50 including at least a first dielectric constant portion 52. The present embodiment also includes bifurcated second sensing electrodes 91A and 91B.

Some embodiments may include bifurcated first sensing electrodes (see FIG. 1). Furthermore, additional divisions in sensing electrodes are possible. For example, alternative embodiments may have one, two, three, or many divisions in the first sensing electrode. Likewise, alternative embodiments may have one, two, three, or many divisions in the second sensing electrode. In embodiments with many sensing electrodes, such as the interdigitated embodiment shown in FIG. 5, each sensing electrode may be have one, two, three, or many divisions in any subset of the sensing electrodes.

In transducer 10 as shown in FIG. 2, actuator bore wall 30 is cylindrical. First insulating material 70 lines the interior of actuator bore wall 30, and electrically insulates bifurcated second sensing electrodes 91A and 91B from actuator bore wall 30. In some embodiments, bifurcated second sensing electrodes 91A and 91B are electrically coupled via a conductive material, for example via lead wires (not shown), such that they stay at the same electric potential. In other embodiments, second sensing electrodes 91A and 91B are insulated from one another.

As in the embodiment described with respect to FIGS. 1A-1B, various changes in the overall geometry of bifurcated transducer 10 may be made and equivalents may be substituted for elements thereof without departing from the scope of the invention. For example, second sensing electrodes 91A and 91B need not be the same size as one another. Additionally, the dimensions of bifurcated transducer may suggest or dictate alternative electrode dimensions. For example, sensing electrodes 91A and 91B may be flat, curved, or any other shape, so long as movement of dielectric shuttle 50 can cause a change to capacitance between second sensing electrodes (91A and 91B) and common electrode 80.

Further, first insulating material 70 may be disposed between bifurcated second sensing electrodes 91A and 91B, or the region between second sensing electrodes 91A and 91B may not be filled with first insulating material 70. Where the region between bifurcated second sensing electrodes 91A and 91B is not filled with first insulating material 70, surface 100 will be substantially smooth but for voids (not shown) where bifurcated second sensing electrodes 91A and 91B are separated from one another.

Each of second sensing electrodes 91A and 91B may be electrically isolated from the other, such that a capacitance measurement may be made separately between each of second sensing electrodes 91A and 91B and common electrode 80. Each of bifurcated second sensing electrodes 91A and 91B in combination with common electrode 80 provides one means for measuring the position of dielectric shuttle 50 via capacitance measurements. Thus, together bifurcated second sensing electrode 91A and 91B combined with common electrode 80 provide redundant ways of measuring the position of dielectric shuttle 50.

Bifurcation of the sensing electrodes is one way of building in redundancy to the apparatus, thereby making it less prone to complete failure. Any of the electrodes used in the apparatus may be divided into any number of redundant plates, so that failure at a single plate, or even at multiple plates, does not render the capacitive position sensing device completely nonfunctional.

Figure 3:
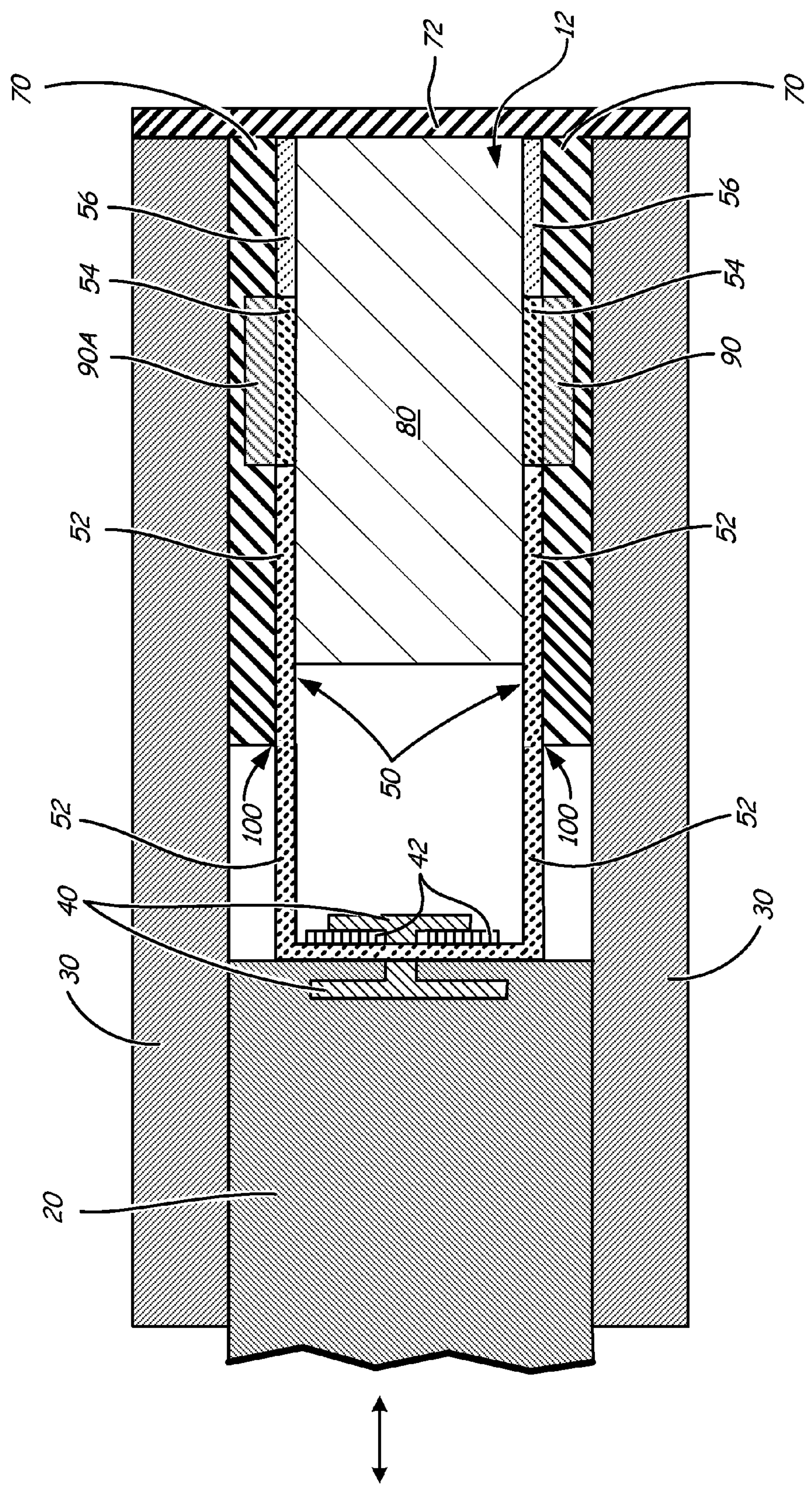
FIG. 3 is a side cross-sectional view of a cylindrical transducer incorporating a capacitive position sensor with one sensing electrode.

FIG. 3 is a side cross-sectional view of an exemplary cylindrical actuator assembly incorporating a capacitive position sensor, with only one sensing electrode. The present embodiment incorporates many of the same or similar components as FIGS. 1A-1B and 2. However, in this embodiment, second sensing electrodes (FIGS. 1A-1B and 2, 91A and 91B) are removed. This embodiment includes transducer 12, which measures movement of actuation assembly 20 along the length of actuator bore wall 30. This measurement is accomplishing by using coupling 40 to attach dielectric shuttle 50 to actuation assembly 20. Compression springs 42 are arranged between dielectric shuttle 50 and coupling 40. Dielectric shuttle 50 includes three sections: first dielectric constant portion 52, second dielectric constant portion 54, and third dielectric constant portion 56. The embodiment shown in FIG. 3 also includes first insulating material 70. Additionally, second insulating material 72 transects actuator bore 30 and the end opposite actuation assembly 20. Adjacent to second insulating material 72, and circumscribed by dielectric shuttle 50, is common electrode 80. Sensing electrode 90 is arranged on first insulating material 70.

Sensing electrode 90 is positioned at one end of the region in which second dielectric constant portion 54 of dielectric shuttle 50 travels in normal operation. Additional embodiments may, for example, position sensing electrode 90 at the other extreme of the range of motion of second dielectric constant portion 54. Furthermore, embodiments of the two-electrode transducer may employ a dielectric shuttle 50 made of all one dielectric constant. However, certain advantages described with respect to embodiments with multiple sensing electrodes, such as the ability to correct for systematic errors by comparing multiple measurements described in paragraph 27, are not present in the embodiment shown in FIG. 3.

Transducer 12 as shown in FIG. 3 may be used to measure displacement of dielectric shuttle 50. Dielectric shuttle 50 may move substantially parallel to the adjacent surface of common electrode 80. As dielectric shuttle 50 moves, a different percentage of the space between common electrode 80 and sensing electrode 90 is filled by first dielectric constant portion 52, second dielectric constant portion 54, or third dielectric constant portion 56. Because second dielectric constant portion 54 cannot extend beyond the end of sensing electrode 90, uncertainty regarding the direction in which the dielectric shuttle 50 is moving as capacitance between sensing electrode 90 and common electrode 80 changes is eliminated. By measuring the capacitance of sensing electrode 90 with common electrode 80, the position of dielectric shuttle 50 can be determined.

The embodiment shown in FIG. 3 shows potential modifications to the structure of the device which embodies the invention. Notably, in the embodiment shown in FIG. 3, there is no requirement that there be two distinct dielectric constant portions in dielectric shuttle 50. Dielectric shuttle 50 may be detected by the electrodes so long as it has a different relative permittivity than the ambient environment surrounding dielectric shuttle 50, such as air, water, fuel, or vacuum, among others. Further, sensing electrode 90 may be positioned at the other end the free range of travel of second dielectric constant portion 54 and still provide direction-specific measurements of the position of dielectric shuttle 50. Finally, the embodiment shown in FIG. 3 requires only one sensing electrode in combination with the common electrode to function as a position sensor.

Figure 4:
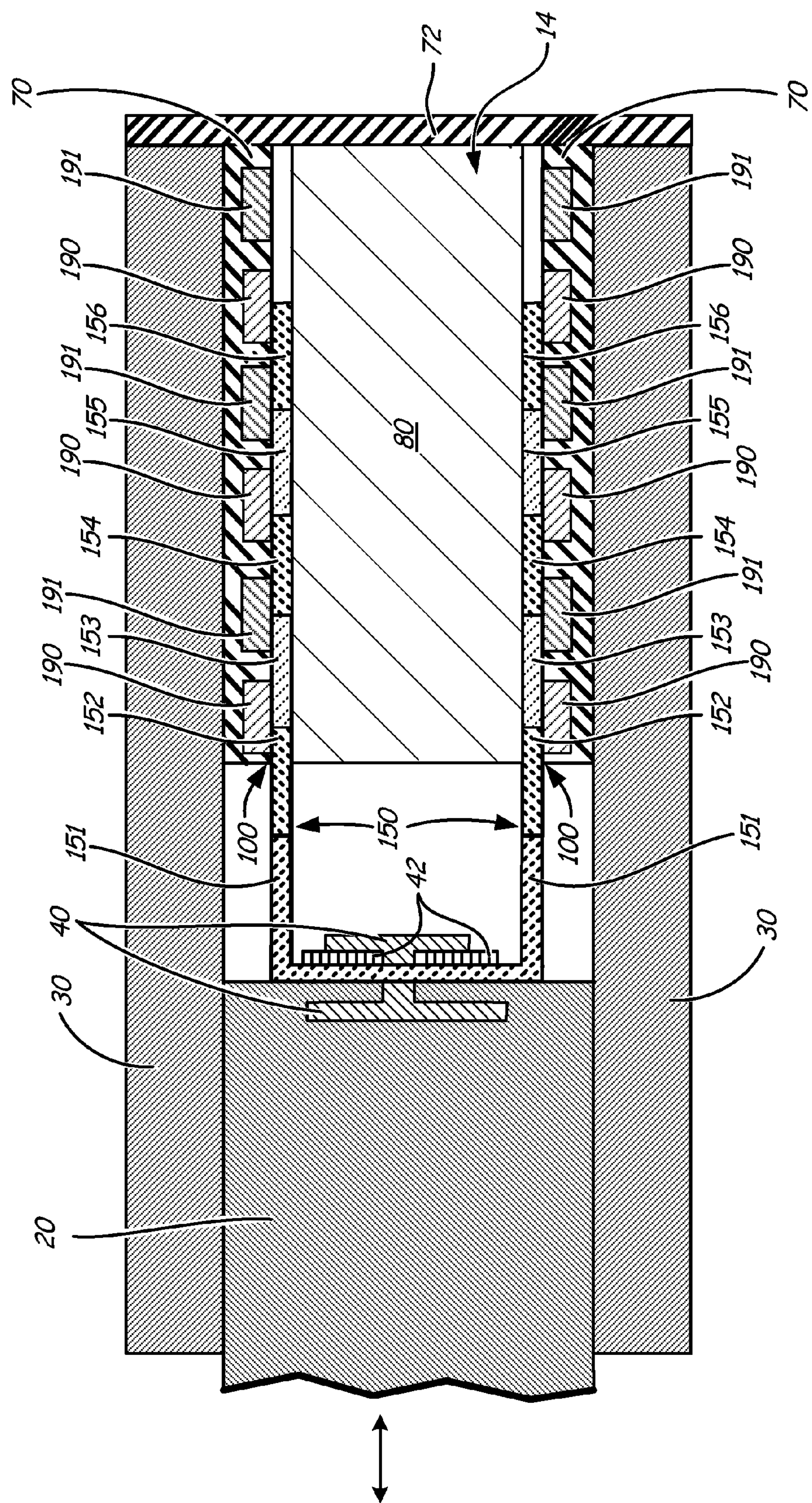
FIG. 4 is a side cross-sectional view of an interdigitated cylindrical transducer incorporating a capacitive position sensor.

FIG. 4 is a side cross-sectional view of an exemplary interdigitated cylindrical transducer incorporating a capacitive position sensor. In particular, FIG. 4 shows an interdigitated cylindrical actuator assembly including six interdigitated sensing electrodes.

The embodiment shown in FIG. 4 incorporates many of the same or similar parts as were used in FIGS. 1A-1B, 2 and 3. For example, the embodiment shown in FIG. 4 includes transducer 14, actuation assembly 20, actuator bore wall 30, coupling 40, compression springs 42, first insulating material 70, second insulating material 72, and common electrode 80. However, in interdigitated embodiments, a plurality of sensing electrodes is arranged along first insulating material 70. Further, dielectric shuttle 150 includes a plurality of sections of dielectric material. In the embodiment shown in FIG. 4, odd dielectric constant portions 151, 153, 155, and 157 are comprised of a material with a first relative permittivity, and even dielectric constant portions 152, 154, 156, and 158 are comprised of a material with a second relative permittivity. In this embodiment, first interdigitated sensing electrodes 190 and second interdigitated sensing electrodes 191 are disposed along first insulating material 70. The edges of first interdigitated sensing electrodes 190, second interdigitated sensing electrodes 191, and first insulating material 70 along dielectric shuttle 150 form surface 100.

The plurality of sensing electrodes includes first alternating sensing electrodes 190 and second alternating sensing electrodes 191. In the embodiment shown, three of each of first alternating sensing electrode 190 and second alternating sensing electrode 191 are arranged on recesses in first insulating material 70. First alternating sensing electrode 190 and second alternating sensing electrode 191 are interdigitated, meaning that they alternate order along surface 100.

First alternating sensing electrodes 190 are electrically coupled, as by lead wires (not shown), such that each first alternating sensing electrode 190 is at a substantially equivalent electrical potential Likewise, second alternating sensing electrodes 191 are electrically coupled, as by lead wires (not shown), such that each second alternating sensing electrode 191 is at a substantially equivalent electrical potential. Alternative embodiments may employ multiple sensing electrodes arranged along surface 100, but which are not electrically coupled. Further, alternative embodiments may include any number of interdigitated sensing electrodes.

Interdigitated electrodes are used to create another embodiment capable of measuring displacement using changes in capacitance. Dielectric shuttle 150 may move substantially parallel to the adjacent surface of common electrode 80. As dielectric shuttle 150 moves, odd dielectric constant portions 151, 153, 155, and 157, as well as even dielectric constant portions 152, 154, 156, and 158, pass between common electrode 80 and surface 100. The capacitance of common electrode 80 with first alternating sensing electrodes 190 varies depending on the position of dielectric shuttle 150. Likewise, the capacitance of common electrode 80 with second alternating sensing electrodes 191 varies depending on the position of dielectric shuttle 150. By measuring these capacitances, the position of dielectric shuttle 150 can be determined.

Interdigitated embodiments of the invention may be used to increase the sensitivity of transducer 14. As compared to a device which is not interdigitated, the region between first alternating sensing electrode 190 and common electrode 80 in interdigitated transducer 14 will change from one relative permittivity to another with a much smaller movement of actuation assembly 20 and/or dielectric shuttle 150. Likewise, the region between second alternating sensing electrode 191 and common electrode 80 in interdigitated transducer 14 will change from one relative permittivity to another with a much smaller movement of actuation assembly and/or dielectric shuttle 150 in the interdigitated embodiment shown.

Figure 5:
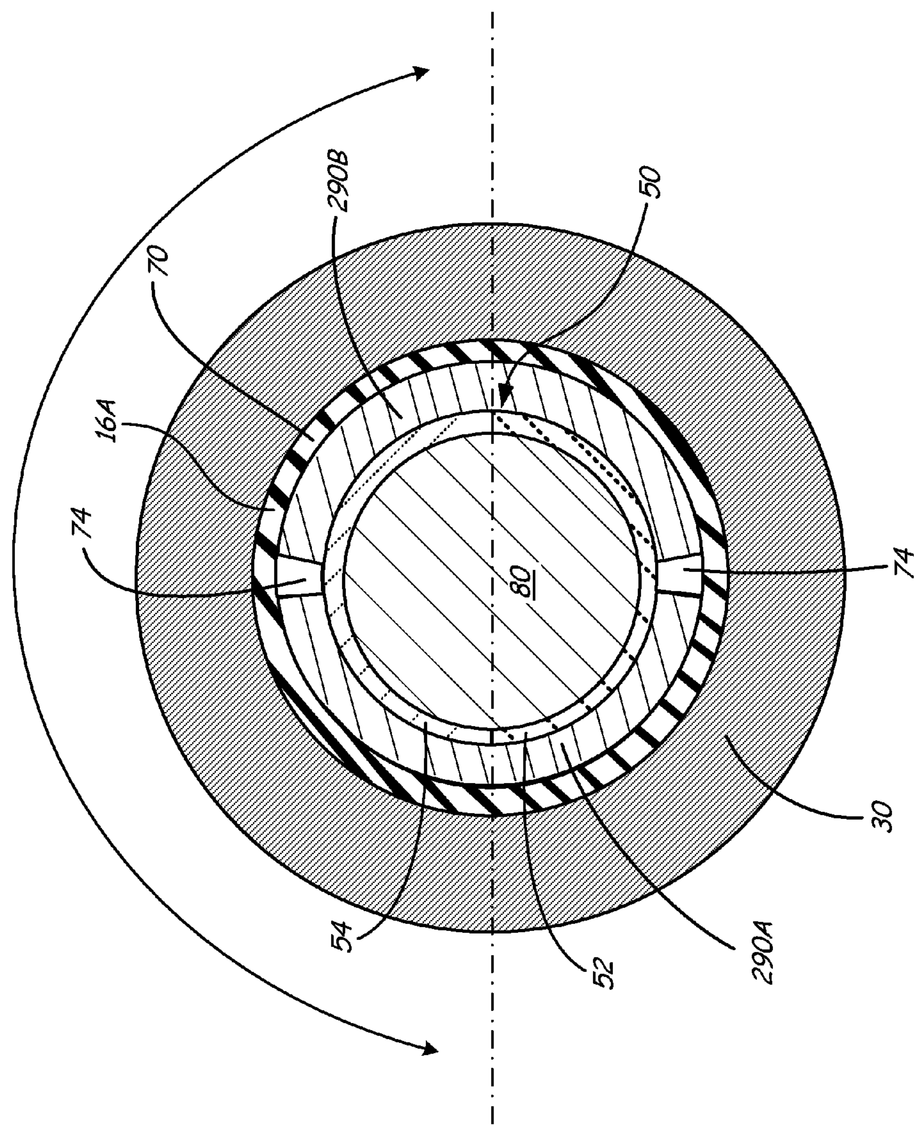
FIG. 5 is a front cross-sectional view of a cylindrical transducer incorporating a rotary capacitive position sensor.

FIG. 5 is a front cross-sectional view of a cylindrical transducer incorporating a rotary capacitive position sensor. Rotary transducer 16A includes many of the same parts as the linear transducers described in previous embodiments. For example, rotary transducer 16A includes first insulating material 70 and common electrode 80. Further, as with the linear transducers described in previous embodiments, rotary transducer 16A may be contained within actuator bore wall 30. Rotary transducer 16A also includes surface 100 and dielectric shuttle 50. Surface 100 is formed by the faces of first sensing electrode 290A and second sensing electrode 290B, as well as first insulating material 70. In this embodiment, voids 74 separate the electrodes. In alternative embodiments, first insulating material 70 may be arranged in place of voids 74. Dielectric shuttle 50 is comprised of first dielectric constant portion 52 and second dielectric constant portion 54.

In this embodiment, actuator bore wall 30 is cylindrical. Inside actuator bore wall 30 is first insulating material 70, first sensing electrode 290A, second sensing electrode 290B, as well as voids 74. First insulating material 70 includes recesses for first sensing electrode 290A and second sensing electrode 290B. In alternative embodiments, more than two sensing electrodes may be arranged on first insulating material 70. Voids 74 separate first sensing electrode 290A from second sensing electrode 290B. In alternative embodiments, this region may be first insulating material 70, rather than voids 74. Substantially adjacent to surface 100 and opposite surface 100 from actuator bore wall 30 is dielectric shuttle 50. Dielectric shuttle 50 is substantially tube-shaped, and includes two dielectric constant portions; first dielectric constant portion 52 and second dielectric constant portion 54.

Rotary capacitive position sensor 16A allows measurement of rotary displacement and velocity. As dielectric shuttle 50 rotates within actuator bore wall 30, the percentage of the region between first sensing electrode 290A and common electrode 80 that is first dielectric constant portion 52 may change. Similarly, as dielectric shuttle 50 rotates within actuator bore wall 30, the percentage of the region between second sensing electrode 290B and common electrode 80 that is second dielectric constant portion 54 may change.

Where first dielectric constant portion 52 has a different permittivity than second dielectric constant portion 54, the capacitance of first sensing electrode 290A with common electrode 80 will be maximized when dielectric shuttle 50 is rotated such that the percentage of space between common electrode 80 and first sensing electrode 290A filled by the portion with a higher relative permittivity is maximized. Likewise, the capacitance of second sensing electrode 290B with common electrode 80 will be maximized when dielectric shuttle 50 is rotated such that the percentage of space between common electrode 80 and second sensing electrode 290B filled by the portion with a higher relative permittivity is maximized. The embodiment shown in FIG. 5 allows for rotation of up to 180° while still being able to discern the direction of rotation.

Furthermore, rotary embodiments of the device may be used to detect the total number of revolutions in addition to the partial revolutions described above. For example, when dielectric shuttle 50 is rotated in one direction, either clockwise or counterclockwise, each peak of the capacitance between common electrode 80 and first sensing electrode 290A corresponds to one full rotation. Similarly, each peak of the capacitance between common electrode 80 and second sensing electrode 290B corresponds to one full rotation. By measuring full rotations in addition to partial rotations, the embodiment shown in FIG. 5 may be used to determine, for example, rotational speed of an attached device.

By measuring these capacitances, the angular position of dielectric shuttle 50 may be determined. Likewise, by counting the total number of cycles of shuttle 50, a count of revolutions and fractions of revolutions can be calculated, both as total displacement and as a rotational speed over one rotational interval or averaged over numerous intervals. Rotary devices such as RVDTs are often more expensive and more complicated than LVDTs, and suffer from additional failure modes related to the complexity of their construction as compared to LVDTs. RVDTs often require bearings, which must be aligned with the rotating device being measured, as well as a complicated internal design of wire coils strategically placed inside the RVDT. The alignment and placement of these coils often has to be precise. Additionally, RVDTs are often larger than LVDTs. The capacitive position sensor shown in FIG. 5 is simple and inexpensive when compared with many commercially available RVDT devices, and is not inherently more complex than its linear counterparts, as shown in FIGS. 1-4.

Figure 6:
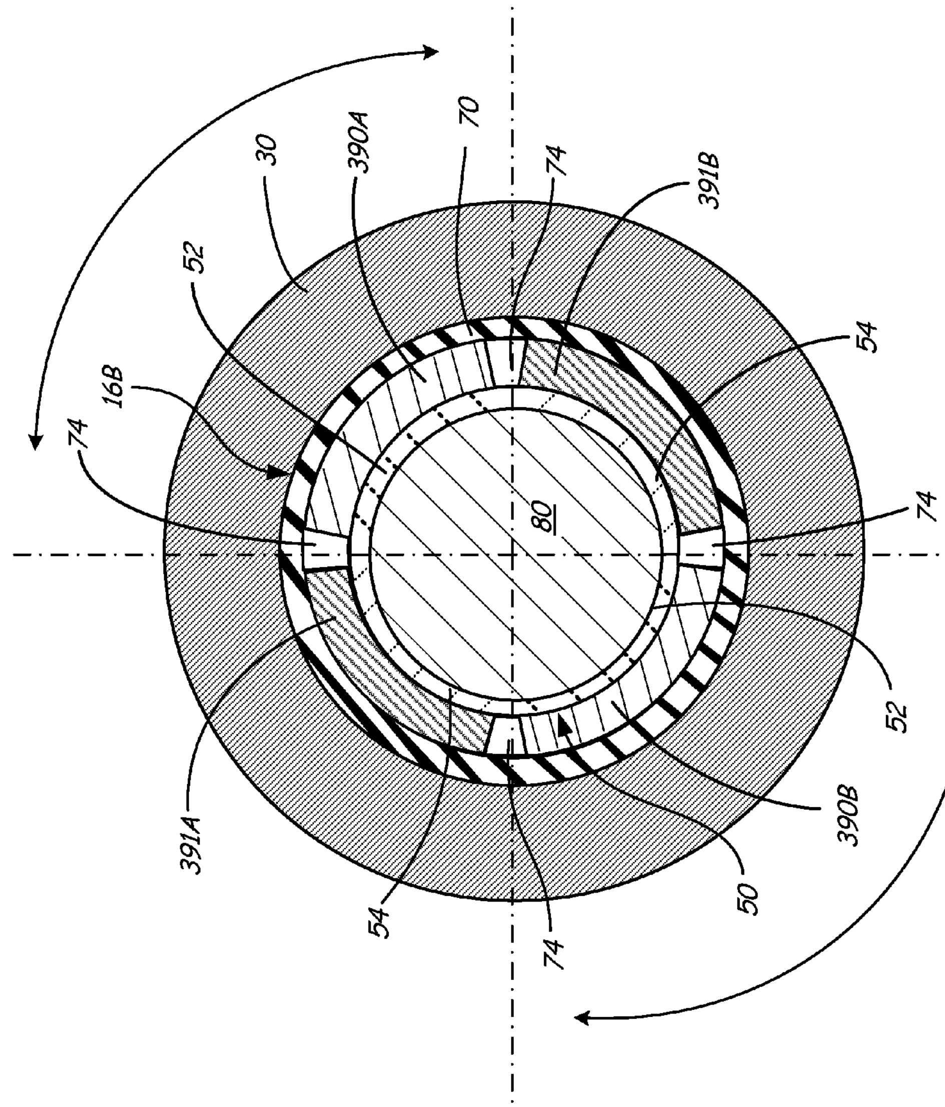
FIG. 6 is a front cross-sectional view of a cylindrical transducer incorporating a rotary capacitive position sensor with a bifurcated sensing electrode.

FIG. 6 is a front cross-sectional view of a cylindrical transducer incorporating a rotary capacitive position sensor with bifurcated electrodes.

Rotary transducer 16B includes many of the same parts as the linear transducers described in previous embodiments and the rotary transducer shown in FIG. 5. For example, rotary transducer 16B includes first insulating material 70 and common electrode 80, may be contained within actuator bore wall 30, and includes dielectric shuttle 50. In this embodiment, voids 74 separate the sensing electrodes. In alternative embodiments, first insulating material 70 may be arranged in place of voids 74. Dielectric shuttle 50 is comprised of first dielectric constant portion 52 and second dielectric constant portion 54. In this embodiment, there are two parts to each of first dielectric constant portion 52 and second dielectric constant portion 54.

In this embodiment, actuator bore wall 30 is cylindrical in shape, and includes a layer of first insulating material 70 which is directly adjacent to actuator bore wall 30, as well as first sensing electrodes 390A and 390B and second sensing electrodes 391A and 391B. The faces of first insulating material 70, first sensing electrodes 390A and 390B, and second sensing electrodes 391A and 391B adjacent to dielectric shuttle 50 form surface 300. First sensing electrodes 390A and 390B and second sensing electrodes 391A and 391B are each split into two parts. In the cross-section shown in FIG. 6, these parts are arranged in an alternating pattern along the inner circumference of first insulating material 70. Surface 300 may include discontinuities due to voids 74 between first sensing electrodes 390A and 390B and second sensing electrodes 391A and 391B. Opposite surface 300 from actuator bore wall 30 is dielectric shuttle 50. Dielectric shuttle 50 includes first dielectric constant portion 52 and second dielectric constant portion 54. Each of first dielectric constant portion 52 and second dielectric constant portion 54 are also split into two parts, complementing first sensing electrodes 390A and 390B and second sensing electrodes 391A and 391B.

By rotating dielectric shuttle 50, first dielectric constant portion 52 may be moved to be predominantly between first sensing electrodes 390A and 390B and common electrode 80, as shown in FIG. 6. In this configuration, second dielectric constant portion 54 may be predominantly between second sensing electrodes 391A and 391B and common electrode 80. Additional rotation of dielectric shuttle 50 may result in a change in the percentage of the region between first sensing electrodes 390A and 390B and common electrode 80 that is first dielectric constant portion 52 and the percentage that is second dielectric constant portion 54 Likewise, by rotating dielectric shuttle 50, the percentage of the region between second sensing electrodes 391A and 391B and common electrode 80 that is first dielectric constant portion 52 and the percentage that is second dielectric constant portion 54 may also change. Measuring the capacitance of first sensing electrodes 390A or 390B or second sensing electrodes 391A or 391B with common electrode 80 provides position information related to the angle and rotational velocity of dielectric shuttle 50.

The embodiment shown in FIG. 6 allows for rotation of up to 90° while still being able to discern the direction of rotation and not create ambiguous indications of position. As in the embodiment shown in FIG. 5, this device may be used to measure rotational speed, where every two peaks in capacitance of common electrode 80 with first sensing electrodes 390A-390B corresponds to one full rotation of dielectric shuttle 50 Likewise, every two peaks in capacitance of common electrode 80 with second sensing electrodes 391A-391B corresponds to one full rotation of dielectric shuttle 50.

The redundant electrodes allow reduce the probability that the device will completely fail. Even if a subset of the redundant plates becomes non-operational, the device may still give adequate information from the remaining functional plates. As with redundant electrodes in the linear transducer shown in FIG. 2, redundancy in rotary transducer 16B may be accomplished by splitting the sensing electrodes one time, two times, or many times.

Figure 7:
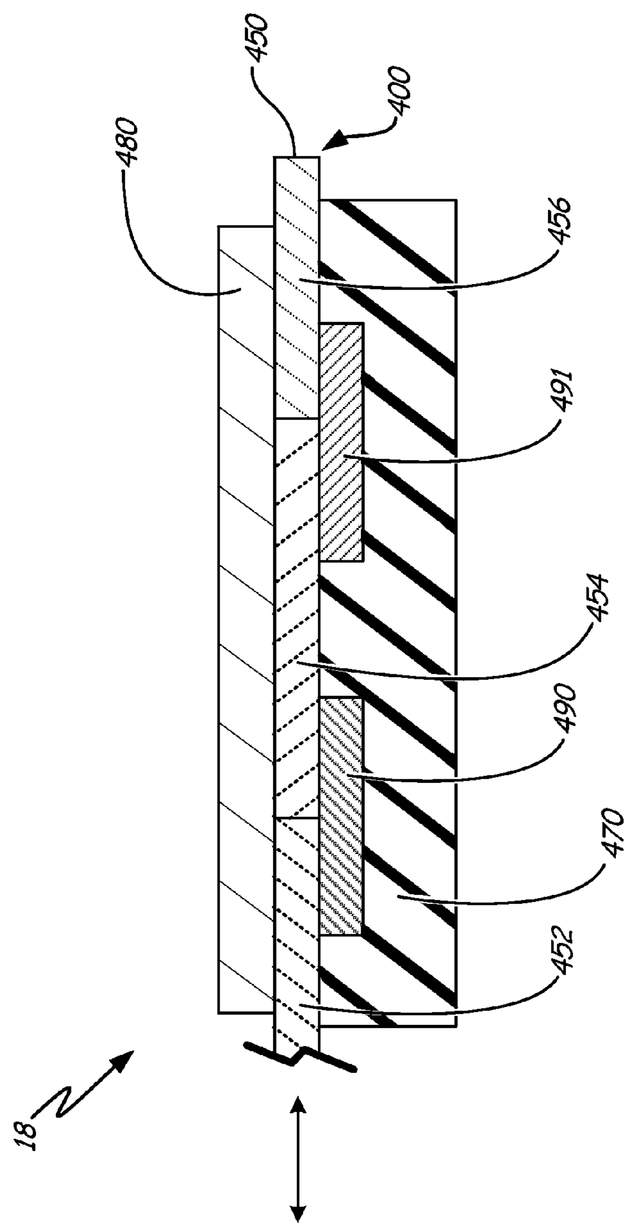
FIG. 7 is a side cross-sectional view of a flat transducer incorporating a capacitive position sensor.

FIG. 7 is a side cross-sectional view of a flat transducer assembly incorporating a capacitive position sensor. Flat transducer 18 incorporates many of the same features as those in previously described embodiments, but in altered geometries. Flat transducer 18 is a very simple alternative geometry, which includes several sheet-like layers. The sheet-like layers each have a non-zero thickness, but their dimensions are substantially-planar such that they include a width and length much larger than their thicknesses.

In this embodiment, flat transducer 18 comprises a series of layered components. One such layer is insulating material 470, as well as a plurality of sensing electrodes. Here, the plurality includes first sensing electrode 490 and second sensing electrode 491. The faces of insulating material 470, first sensing electrode 490 and second sensing electrode 491 along dielectric shuttle 450 forms surface 400. The present embodiment does not include an actuator bore or an actuator assembly, or any coupling or compression springs for attaching dielectric shuttle 450 thereto.

Insulating material 470 comprises several recesses in which first sensing electrode 490 and second sensing electrode 491 are disposed. Adjacent to surface 400 is arranged dielectric shuttle 450, which includes first dielectric constant portion 452, second dielectric constant portion 454, and third dielectric constant portion 456. Opposite dielectric shuttle 450 from surface 400 is arranged flat common electrode 480.

In this embodiment, there is no center or axis around which the parts are arranged. Thus, there are fewer constraints on the design of flat transducer 18. Flat common electrode 480 is an electrode which faces each of first sensing electrode 490 and second sensing electrode 491 across dielectric shuttle 450. Further, dielectric shuttle 450 as shown is a flat portion of material with at least two dielectric constants; first dielectric constant portion 452, second dielectric constant portion 454, and third dielectric constant portion 456.

In alternative embodiments of flat transducer 18, modifications may be made without departing from the scope of the invention. For example, additional sensing electrodes may be added, insulating material 470 may cover additional faces of flat transducer 18, or flat common electrode 480 may be larger or smaller, among others.

Flat transducer 18 works in much the same way as the previously described embodiments of the invention. During operation, dielectric shuttle 450 is positioned such that it is at least partially between first sensing electrode 490 and flat common electrode 480 and/or at least partially between second sensing electrode 491 and flat common electrode 480. By measuring the capacitance of two of the electrodes (either first sensing electrode 490 with common electrode 480 or second sensing electrode 491 with common electrode 480), the position of dielectric shuttle 450 can be determined. Dielectric shuttle 450 may move substantially parallel to the surface of flat electrode 480. As a result, the percentage of the space between sensing electrodes 490 or 491 and flat common electrode 480 made up of first dielectric constant portion 452, second dielectric constant portion 454, or third dielectric constant portion 456 may change with the position of dielectric shuttle 450. By measuring the capacitance of first sensing electrode 490 and flat common electrode 480, the position of first dielectric constant portion 452, second dielectric constant portion 454, or third dielectric constant portion 456, and by inference dielectric shuttle 450, can be determined. Likewise, by measuring the capacitance of second sensing electrode 491 and flat common electrode 480, the position of first dielectric constant portion 452, second dielectric constant portion 454, and third dielectric constant portion 456, and by inference dielectric shuttle 450, can be determined.

FIG. 7 illustrates one alternative geometry in which capacitive sensing transducers can be made. Depending on the intended use, cylindrical, flat, parallelepiped, generalized cylinder, or any other shape including a cavity with dimensions constant along at least one axis may be advantageous. Additional geometries may further alter the shape and size of flat common electrode 480, first sensing electrode 490, and/or second sensing electrode 491 in order to modify the sensitivity or range of capacitance readings for different positions of dielectric shuttle 450. Likewise, the geometry or relative permittivity of components of dielectric shuttle 450 may be modified in order to achieve increased or decreased sensitivities for different positions of dielectric shuttle 450. For example, in alternative embodiments, second dielectric constant portion 454 may have a monotonically increasing relative permittivity in one direction in order to provide greater sensitivity as the high-permittivity portion passes between any pair of electrodes. Additionally, those skilled in the art will recognize that dielectric shuttle 450 may be fixed and sensing electrodes 490 and 491 may rotate, so long as the capacitance between sensing electrodes 490 and 491 and common electrode 80 is modulated.

Figure 8:
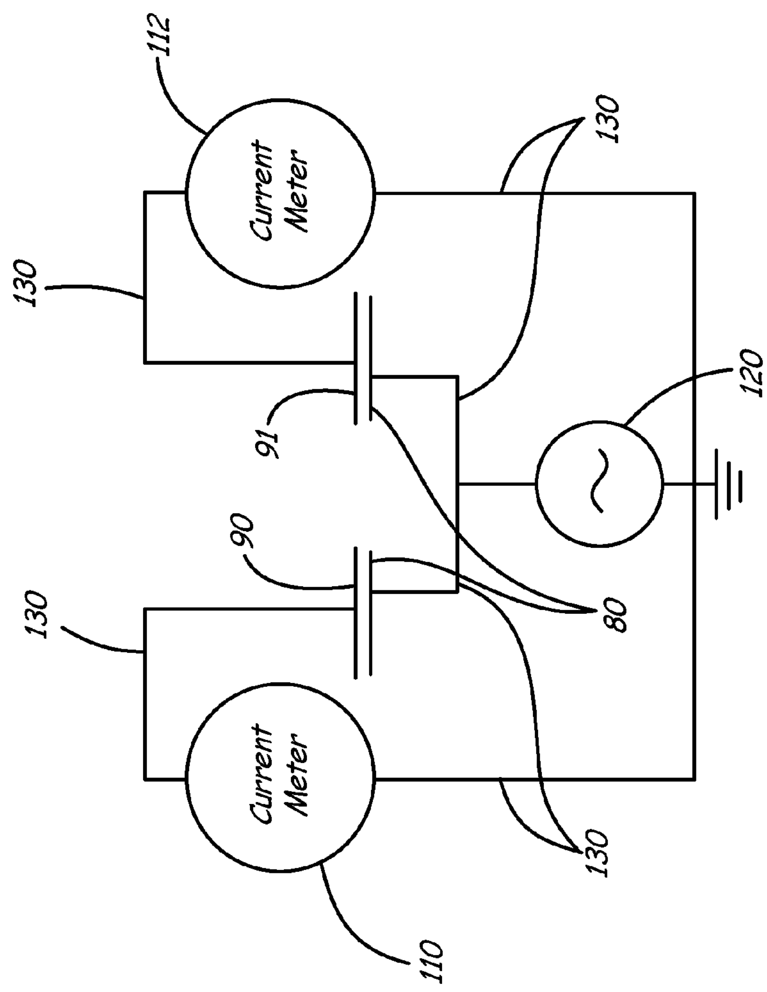
FIG. 8 is a simplified circuit diagram of a capacitive position sensor.

FIG. 8 shows a simplified circuit diagram with one possible way of wiring a capacitive position sensor. FIG. 8 is a circuit diagram of a capacitive position sensor with alternating current supplied to common electrode 80. Common electrode 80 is shown as two plates, the first plate opposite first sensing electrode 90 and the second plate opposite second sensing electrode 91, connected via lead wire 130. It will be understood by those of ordinary skill in the art that this is the electronic equivalent of a single, larger electrode which is forming one half of each of two capacitors forming common electrode 80. First current meter 110 and second current meter 112 are electrically coupled to the electrodes via lead wires 130.

First alternating current voltage source 120 is electrically coupled to common electrode 80 via lead wires 130. Common electrode 80 and first sensing electrode 90 form a capacitor. First current meter 110 measures current from first sensing electrode 90 to ground. Likewise, common electrode 80 and second sensing electrode 91 form a capacitor. Second current meter 112 measures current from second sensing electrode 91 to ground. In alternate embodiments, alternating current may be applied to first sensing electrode 90 and second sensing electrode 91, rather than to common electrode 80. Further, other methods for measuring capacitance understood to those skilled in the art may be employed.

By comparing the current sensed by first current meter 110 with the current sensed by second current meter 112, the position of dielectric shuttle 50 may be determined. For example, in a simple capacitive position meter where first sensing electrode 90 and second sensing electrode 91 are identically sized and shaped and equidistant from common electrode 80, if the capacitance measured at first current meter 110 is greater than the capacitance measured at second current meter 112 then the dielectric constant of the material between first sensing electrode 90 and common electrode 80 is greater than the dielectric constant of the material between second sensing electrode 91 and common electrode 80.

Additionally, a change in capacitance measured by first current meter 110 may be correlated to a change in position of dielectric shuttle 50. Likewise, a change in capacitance measured by second current meter 112 may be correlated to a change in position of dielectric shuttle 50. In combination, this information can be used to determine position and/or velocity of dielectric shuttle 50. The capacitance values derived from the sensed currents from current meters 110 and 112 can be combined to determine the position of the shuttle with greater accuracy than by using one alone.

The simplified circuit diagram shown in FIG. 8 shows one possible way of setting up a capacitive position sensor. Other possible circuit diagrams are possible, for example the bifurcated capacitive position sensors as shown in FIGS. 1 and 2 may have additional capacitive sensors. Likewise, a capacitive position sensor as shown in FIG. 3 may have only one capacitive sensor. Further, an interdigitated capacitive position sensor as shown in FIG. 4 may be shown with a circuit diagram with multiple capacitors in parallel, and/or with multiple capacitive position sensors. In all embodiments, a relatively simple circuit can be constructed which will provide electrical output related to the position or movement of dielectric shuttle 50 and other components attached thereto. Depending on the best way to optimize the concept for a given application, various combinations of measuring capacitances from the individual electrodes either individually or electrically connected in common can be done. Alternatives to alternating current may also be employed, such as delta-sigma modulation or C/D modulation conversion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method for measuring position can include arranging a dielectric shuttle such that it is at least partially between a common electrode and a first sensing electrode; sensing a capacitance of the common electrode in combination with the first sensing electrode; and measuring the position of the dielectric shuttle based on the sensed capacitance.

The method of the preceding paragraph can optionally include, additionally and/or alternatively, any one or more of the following features, configurations and/or additional components:

moving the dielectric shuttle relative to the first sensing electrode such that it passes between the common electrode and a second sensing electrode, sensing the capacitance of the common electrode in combination with the second sensing electrode, and measuring the position of the dielectric shuttle based on the sensed capacitances;

moving the dielectric shuttle relative to the first sensing electrode is accomplished by moving an actuator assembly which is mechanically coupled to the dielectric shuttle;

moving the dielectric shuttle relative to the first sensing electrode is accomplished by moving an actuator assembly which is mechanically coupled to the first sensing electrode and the second sensing electrode;

applying alternating current to the common electrode;

applying alternating current to the first sensing electrode; and applying alternating current to the second sensing electrode; and moving the dielectric shuttle further includes rotating the dielectric shuttle in an orbit around the common electrode, and further including counting the number of full rotations of the dielectric shuttle.

A transducer can include an insulating material; a first sensing electrode disposed on the insulating material; a second sensing electrode disposed on the insulating material; a common electrode; and a dielectric shuttle, movable in a direction substantially parallel to a surface of the common electrode, arranged between the first sensing electrode and the common electrode, wherein the dielectric shuttle includes a first portion with a first dielectric constant; and a second portion with a second dielectric constant.

The component of the preceding paragraph can optionally include, additionally and/or alternatively, any one or more of the following features, configurations and/or additional components:

the first dielectric constant is not equal to the second dielectric constant;

the dielectric shuttle is mechanically coupled to an actuation assembly;

the first sensing electrode further comprises a plurality of redundant sensing electrodes;

the second sensing electrode further comprises a plurality of redundant electrodes;

the first sensing electrode and the second sensing electrode are interdigitated;

a first current meter configured to sense the capacitance of the common electrode with the first sensing electrode; and a second current meter configured to sense the capacitance of the common electrode with the second sensing electrode;

an alternating current voltage source, wherein the alternating current voltage source is electrically coupled to the common electrode to provide alternating current to the common electrode;

the first sensing electrode and the second sensing electrode are disposed on the insulating material;

the insulating material includes a plurality of recesses; and the first sensing electrode and the second sensing electrode are disposed within the recesses, such that a surface formed by the insulating material, the first sensing electrode, and the second sensing electrode is substantially smooth; and the combination of the insulating material, the first sensing electrode, and the second sensing electrode is substantially shaped as a hollow cylinder with an opening on at least one end; the dielectric shuttle is substantially shaped as a hollow open-ended cylinder; and the common electrode is substantially shaped as a cylinder.

A transducer can include an insulating material; a first electrode disposed on the insulating material; a second electrode, spaced from the first electrode; and a dielectric shuttle, movable in a space between the first and second electrodes to produce a capacitance between the first and second electrodes that is a function of position of the dielectric shuttle.

The component of the preceding paragraph can optionally include, additionally and/or alternatively, any one or more of the following features, configurations and/or additional components:

the second portion is selected from the group consisting of air, water, oil, fuel, or vacuum;

the first portion has a relative permittivity greater than 10; and the dielectric shuttle is attached to an actuation assembly, and the dielectric shuttle moves in response to movement of the actuation assembly.

The invention claimed is:

1. A method for measuring position, the method comprising:

arranging a dielectric shuttle such that it is at least partially between a common electrode and a first sensing electrode, the dielectric shuttle having a first dielectric constant portion and a second dielectric constant portion with different relative permittivities, and being arranged with a first percentage of the first dielectric constant portion and a second percentage of the second dielectric constant portion located between the common electrode and the first sensing electrode;

sensing a first capacitance of the common electrode in combination with the first sensing electrode, the first capacitance being based on the first percentage and the second percentage;

moving the dielectric shuttle relative to the first sensing electrode such that it passes between the common electrode and a second sensing electrode, with a third percentage of the first dielectric constant portion and a fourth percentage of the second dielectric constant portion located between the common electrode and the second sensing electrode;

sensing a second capacitance of the common electrode in combination with the second sensing electrode, the second capacitance being based on the third percentage and the fourth percentage; and measuring the position of the dielectric shuttle based on the sensed first and second capacitances.

2. The method of claim 1, wherein moving the dielectric shuttle relative to the first sensing electrode is accomplished by moving an actuator assembly which is mechanically coupled to the dielectric shuttle.

3. The method of claim 1, wherein moving the dielectric shuttle relative to the first sensing electrode is accomplished by moving an actuator assembly which is mechanically coupled to the first sensing electrode and the second sensing electrode.

4. The method of claim 1, further comprising applying alternating current to the common electrode.

5. The method of claim 1, further comprising:

applying alternating current to the first sensing electrode; and applying alternating current to the second sensing electrode.

6. The method of claim 1, wherein:

moving the dielectric shuttle further comprises rotating the dielectric shuttle in an orbit around the common electrode;

and further comprising counting the number of full rotations of the dielectric shuttle.

7. A transducer comprising:

an insulating material;

a first sensing electrode disposed on the insulating material;

a second sensing electrode disposed on the insulating material;

a common electrode; and a dielectric shuttle, movable in a direction substantially parallel to a surface of the common electrode, arranged with a first part of the dielectric shuttle between the first sensing electrode and the common electrode and a second part of the dielectric shuttle between the second sensing electrode and the common electrode, wherein the dielectric shuttle comprises:

a first portion with a first dielectric constant; and a second portion with a second dielectric constant that is not equal to the first dielectric constant;

wherein a first capacitance between the first sensing electrode and the common electrode is based on a first percentage of the first portion that makes up the first part of the dielectric shuttle and a second percentage of the second portion that makes up the first part of the dielectric shuttle; and wherein a second capacitance between the second sensing electrode and the common electrode is based on a third percentage of the first portion that makes up the second part of the dielectric shuttle and a fourth percentage of the second portion that makes up the second part of the dielectric shuttle.

8. The transducer of claim 7, wherein the dielectric shuttle is mechanically coupled to an actuation assembly.

9. The transducer of claim 7, wherein the first sensing electrode further comprises a plurality of redundant sensing electrodes.

10. The transducer of claim 7, wherein the second sensing electrode further comprises a plurality of redundant electrodes.

11. The transducer of claim 7, wherein the first sensing electrode and the second sensing electrode are interdigitated.

12. The transducer of claim 7, further comprising:

a first current meter configured to sense the capacitance of the common electrode with the first sensing electrode; and a second current meter configured to sense the capacitance of the common electrode with the second sensing electrode.

13. The transducer of claim 12, further comprising an alternating current voltage source, wherein the alternating current voltage source is electrically coupled to the common electrode to provide alternating current to the common electrode.

14. The transducer of claim 7, wherein the insulating material includes a plurality of recesses; and the first sensing electrode and the second sensing electrode are disposed within the recesses, such that a surface formed by the insulating material, the first sensing electrode, and the second sensing electrode is substantially smooth.

15. The transducer of claim 7, wherein the combination of the insulating material, the first sensing electrode, and the second sensing electrode is substantially shaped as a hollow cylinder with an opening on at least one end;

the dielectric shuttle is substantially shaped as a hollow open-ended cylinder; and the common electrode is substantially shaped as a cylinder.

16. The transducer of claim 7, wherein the first portion has a relative permittivity greater than 10.

17. A method for measuring position, the method comprising:

arranging a dielectric shuttle such that it is at least partially between a common electrode and a first sensing electrode, the dielectric shuttle having a first dielectric constant portion and a second dielectric constant portion with different relative permittivities;

sensing a capacitance of the common electrode in combination with the first sensing electrode;

moving the dielectric shuttle relative to the first sensing electrode such that it passes between the common electrode and a second sensing electrode by rotating the dielectric shuttle around the common electrode;

sensing the capacitance of the common electrode in combination with the second sensing electrode; and measuring the position of the dielectric shuttle based on the sensed capacitances, including counting the number of full rotations of the dielectric shuttle.

* * * * *